(12) United States Patent
Williams (10) Patent No.: US 9,177,328 B2
(45) Date of Patent: Nov. 3, 2015

(54) PEER-TO-PEER NETWORK CHATTING (75) Inventor: Patrick Williams, Berkeley, CA (US)

(73) Assignee: BitTorrent, Inc., San Francisco, CA (US)

( * ) Notice: Subject to any disclaimer, the term of this patent is extended or adjusted under 35 U.S.C. 154(b) by 0 days.

(21) Appl. No.: 13/529,996

(22) Filed: Jun. 21, 2012

(65) Prior Publication Data

US 2012/0331073 A1 Dec. 27, 2012

Related U.S. Application Data (60) Provisional application No. 61/499,521, filed on Jun. 21, 2011.

(51) Int. Cl.
*G06F 15/16* (2006.01)
*G06Q 30/02* (2012.01)
*H04L 12/18* (2006.01)
*H04L 29/08* (2006.01)

(52) U.S. Cl.
CPC ........ *G06Q 30/0251* (2013.01); *H04L 12/1818* (2013.01); *H04L 67/1046* (2013.01); *H04L 67/1065* (2013.01)

(58) Field of Classification Search
CPC ....................................................... G06F 15/16
USPC ........................................................ 709/206
See application file for complete search history.

(56) References Cited

U.S. PATENT DOCUMENTS

| 2006/0209727 A1 | 9/2006 | Jenning, III et al. | |
| 2007/0275696 A1* | 11/2007 | Cheng et al. | 455/412.1 |
| 2009/0316687 A1* | 12/2009 | Kruppa | 370/352 |
| 2010/0064008 A1* | 3/2010 | Yan et al. | 709/204 |
| 2010/0180217 A1* | 7/2010 | Li | 715/758 |
| 2010/0205541 A1* | 8/2010 | Rapaport et al. | 715/753 |

FOREIGN PATENT DOCUMENTS

| KR | 10-2001-0069292 A | 7/2001 |
| KR | 10-2006-0064780 A | 6/2006 |

OTHER PUBLICATIONS

PCT International Search Report and Written Opinion, PCT Application No. PCT/US2012/043639, Jan. 21, 2013, 8 pages.

* cited by examiner

*Primary Examiner* — Vivek Srivastava
*Assistant Examiner* — Sibte Bukhari
(74) *Attorney, Agent, or Firm* — Fenwick & West LLP (57) ABSTRACT A peer in a peer-to-peer network joins an advertisement room having an associated identifier. A joining peer identifies a peer closest to the advertisement room. In various embodiments, the peer that is closest to the advertising room is the peer having a discreet hash table ID closest to the advertisement room identifier. The joining peer requests from the closest peer information about peers that the closest peer knows to be part of the advertisement room. The closest peer provides the joining peer with connection information for those peers, and the joining peer establishes connections with the peers. Peers in the advertisement room provide advertisements for chat rooms. To join a chat room, a peer determines which of its peers in the advertisement room is the closest peer to the chat room, based on the chat room identifier, and informs that peer that it is now part of the chat room.

17 Claims, 4 Drawing Sheets

PEER-TO-PEER NETWORK CHATTING

CROSS-REFERENCE TO RELATED APPLICATIONS

This application claims the benefit of provisional application 61/499,521, filed on Jun. 21, 2011, which is incorporated by reference in its entirety.

BACKGROUND

1. Field

The described embodiments generally relate to peer-to-peer networks, and more particularly describe exchanging chat messages via a peer-to-peer network.

2. Description of the Related Art

In a peer-to-peer (P2P) environment, swarms of peers exchange files directly with each other, without the use of an intermediary server. Because typical chat applications that enable computer users to chat with one another require the use of an intermediary server, however, P2P environments typically do not include an ability for users in the swarm to chat collaboratively.

SUMMARY

Described embodiments include systems and methods for enabling chat among peers in a peer-to-peer environment. A first peer provides connection information about the first peer to a communication server. Other peers obtain the connection information about the first peer from the communication server and use the information to connect to the first peer. Those peers in turn provide connection information, and the swarm of peers grows.

In various embodiments, one or more peers join an advertisement room. The advertisement room has an associated identifier, which in one embodiment is kept static. A joining peer identifies a peer that is closest to the advertisement room. In various embodiments, the peer that is closest to the advertising room is the peer having a discreet hash table ID (DHT ID) closest to the advertisement room identifier. The joining peer then requests from the closest peer information about peers that the closest peer knows to be part of the advertisement room. The closest peer provides the joining peer with connection information for those peers, and the joining peer then establishes connections with the peers.

Peers in the advertisement room in various embodiments provide advertisements for chat rooms. An advertisement for a chat room in one embodiment includes a chat room identifier, chat room name, and additional information about the chat room. To join a chat room, an interested peer determines which of its peers in the advertisement room is the closest peer to the chat room, based on the chat room identifier, and informs that peer that it is now part of the chat room.

Peers in a chat room receive messages from other peers, and in turn forward the received messages to the other peers in the chat room to which they are connected. A user interface of each peer displays all of the messages from the chat room to users of the peer. The user can then participate in the peer-to-peer chat without the presence of an intermediary server.

DETAILED DESCRIPTION

An embodiment is now described with reference to the figures where like reference numbers indicate identical or functionally similar elements. In the figures, a letter after a reference numeral, such as "102A," indicates that the text refers specifically to the element having that particular reference numeral. A reference numeral in the text without a following letter, such as "102," refers to any or all of the elements in the figures bearing that reference numeral (e.g., "102" in the text refers to reference numerals "102A," and/or "102B" in the figures).

Figure 1:
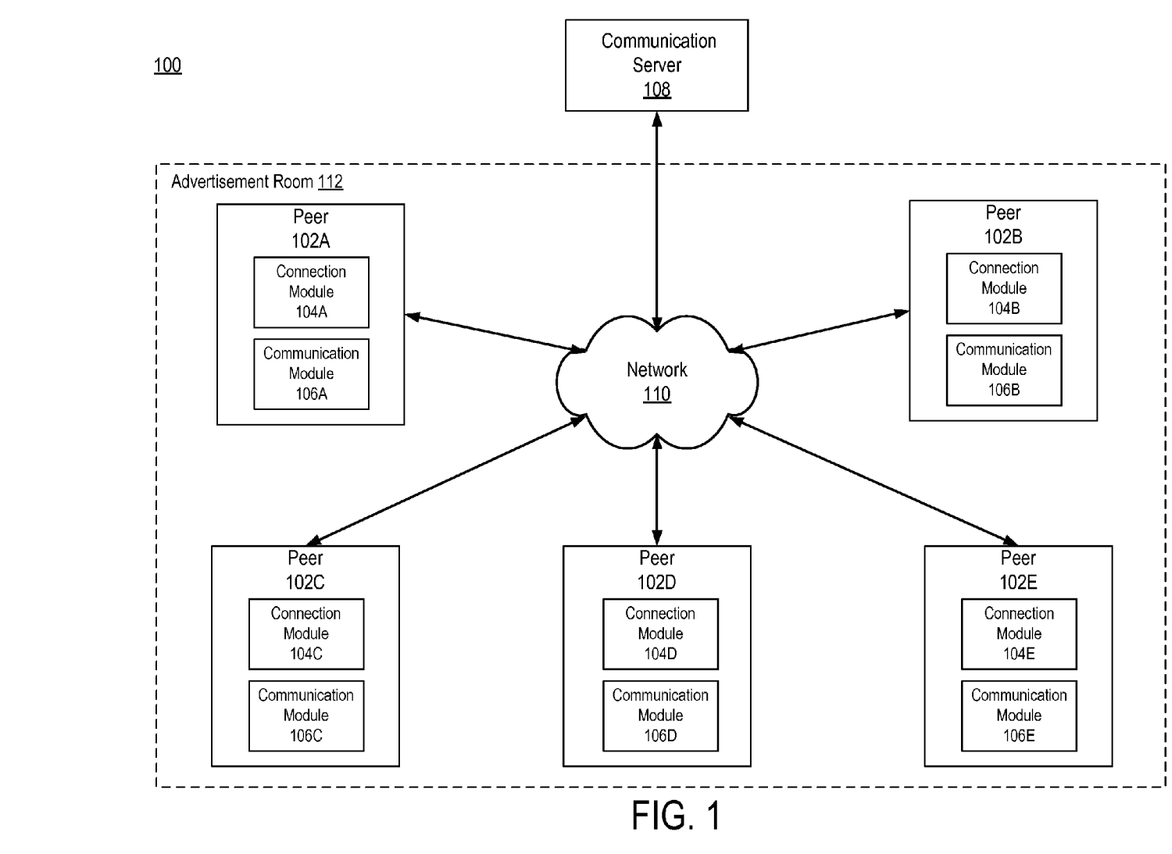
FIG. 1 is a block diagram of a communication environment according to one embodiment.

FIG. 1 is a block diagram of a communication environment 100 according to one embodiment. FIG. 1 illustrates peers 102A through 102E and a communication server 108 connected to a network 110. Although the illustrated communication environment 100 only shows five peers 102, as implemented the environment 100 may include thousands or millions of peers 102. A peer 102 is a device that communicates with other entities via the network 110. Each peer 102 includes a connection module 104 and a communication module 106.

Communication server 108 is a device that stores and provides connection information about peers that join the communication environment 100. When a peer 102 joins the communication environment 100, the peer 102 transmits its connection information to the communication server 108. The communication server 108 stores the connection information and provides the peer 102 with connection information of other peers 102 that recently provided connection information to the sever 108 (e.g., connection information of the last 8 peers that connected with the server 108).

The network 110 enables communications among the entities connected to it. In one embodiment, the network 110 is the Internet and uses standard communications technologies and/or protocols. Thus, the network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc.

The peers illustrated in FIG. 1 form part of a peer-to-peer system, also known as a swarm, represented in FIG. 1 as an advertisement room 112. Peers 102 in the advertisement room 112 advertise the availability of chat rooms to other peers in the advertisement room 112. A chat room advertisement includes information the other peers can use to join the chat room.

A chat room is a swarm of peers that exchange messages among themselves, e.g., about a particular topic. In one embodiment, while a peer 102 is a member of a chat room, the peer 102 is also part of the advertisement room 112. In another embodiment, it is possible to be a member of a chat room without being part of the advertisement room 112 (e.g., by leaving the advertisement room 112 swarm after joining a chat room swarm).

Connection module 104 of a peer 102 establishes P2P connections with other peers. In one embodiment, connection module 104 operates according to the BitTorrent protocol. To establish connections with other peers of the communication environment 100, connection module 104 transmits to communication server 108 connection information that will allow other peers to communicate with it. In one embodiment, connection information includes one or more of the following: a distributed hash table identification (DHT ID) that unambiguously identifies the peer's connection module 104, a port number, an IP address, and a public key of the peer 102. In one embodiment, the DHT ID is a 120-bit integer randomly generated by connection module 104.

In various embodiments, communication server 108 provides the received connection information to a number of other peers. In one embodiment, connection information is provided for the last 8 peers that communicated with the communication server 108. The connection module 104 of a peer receiving the connection information from communication server 108 establishes connections with one or more of the described other peers. This process of communicating with the communication server 108 when the connection module 104 is executed is referred to as a bootstrapping process.

In one embodiment, a peer 102 joins or logs in to the advertisement room 112 using an identifier assigned to the room. In one embodiment, the identifier is a 120-bit integer hash generated for the advertisement room 112. In one embodiment, the advertisement room identifier is kept static so that a peer 102 can easily join the advertisement room 112 at anytime. In one embodiment, the advertisement room identifier is 120 bits of zeroes. Connection module 104 uses the connection information received for peers from the communication server 108 during the bootstrapping process to determine which of the peers is closest to the advertisement room identifier. In one embodiment, to determine which peer 102 is the closest, for each peer 102 connection module 104 performs a DHT lookup, taking the difference between the DHT ID of the peer 102 and the advertisement room identifier. The peer 102 having the DHT ID used to calculate the lowest difference is determined to be the closest peer 102.

In one embodiment, the connection module 104 communicates with the closest peer 102 and requests connection information for peers that it knows are part of the advertisement room 112. The peer 102 receiving the request (the closest peer) provides the connection module 104 of the requesting peer with connection information for peers that it knows are part of the advertisement room 112. In one embodiment, the closest peer 102 provides connection information for a set number of peers that are part of the advertisement room 112. To join the advertisement room 112, the connection module 104 of the requesting peer establishes connections with peers of the advertisement room 112 for which it received connection information from the closest peer. In another embodiment, instead of only communicating with the closest peer 102 to obtain connection information, the connection module 104 may obtain connection information from a set number of closest peers (e.g., the three closest peers).

A user of the peer 102 (which we refer to simply as the peer for the sake of brevity) may decide to join a chat room in response to seeing an advertisement for the chat room. In one embodiment, upon instructions from the user to join the chat room, communication module 106 provides details contained in the advertisement to connection module 104 including an identifier for the chat room.

Connection module 104 determines which of the peers in the advertisement room 112 with which it has a connection has a DHT ID closest to the chat room identifier. The connection module 104 requests from the peer 102 closest to the chat room identifier connection information about peers that it knows are part of the chat room. Each peer 102 in advertisement room 112 is responsible for keeping track of peers that are part of chat rooms whose chat room identifiers are close to that of its own DHT ID. The connection module 104 receives from the closest peer 102 connection information on peers that the closest peer 102 knows are part of the chat room.

To join the chat room, the peer's connection module 104 establishes connections with those peers in the chat room for which it received connection information.

The communication module 106 of a peer 102 allows the peer 102 to exchange messages with other peers in the advertisement room 112. In one embodiment, the communication module 106 is a plug-in of the connection module 104. In one embodiment, the communication module 106 sends and receives messages that are extensions of the BitTorrent protocol.

In one embodiment, when the communication module 106 receives an advertisement advertising a chat room that is available for peers to join, the communication module 106 shows that the room is available in a user interface window presented to a user of the peer 102. If the user requests to join the chat room, the communication module 106 identifies from the advertisement the identifier of the chat room. The communication module 106 provides the chat room identifier to the connection module 104 so that it can establish connections with peers that are members of the chat room.

If the user requests to transmit a message to members of the chat room, the communication module 106 transmits the message to members of the chat room with whom the connection module 104 has established connections. If the communication module 106 receives a message from a member of the chat room, the message is presented to the user in a user interface window that includes messages associated with the chat room. In one embodiment, the communication module 106 forwards the message to other members of the chat room that the peer 102 has a connection with and which have not yet received the message. As is described below with respect to FIG. 3, the user of the peer 102 can also use the communication module 106 to chat privately with another peer 102.

Figure 2:
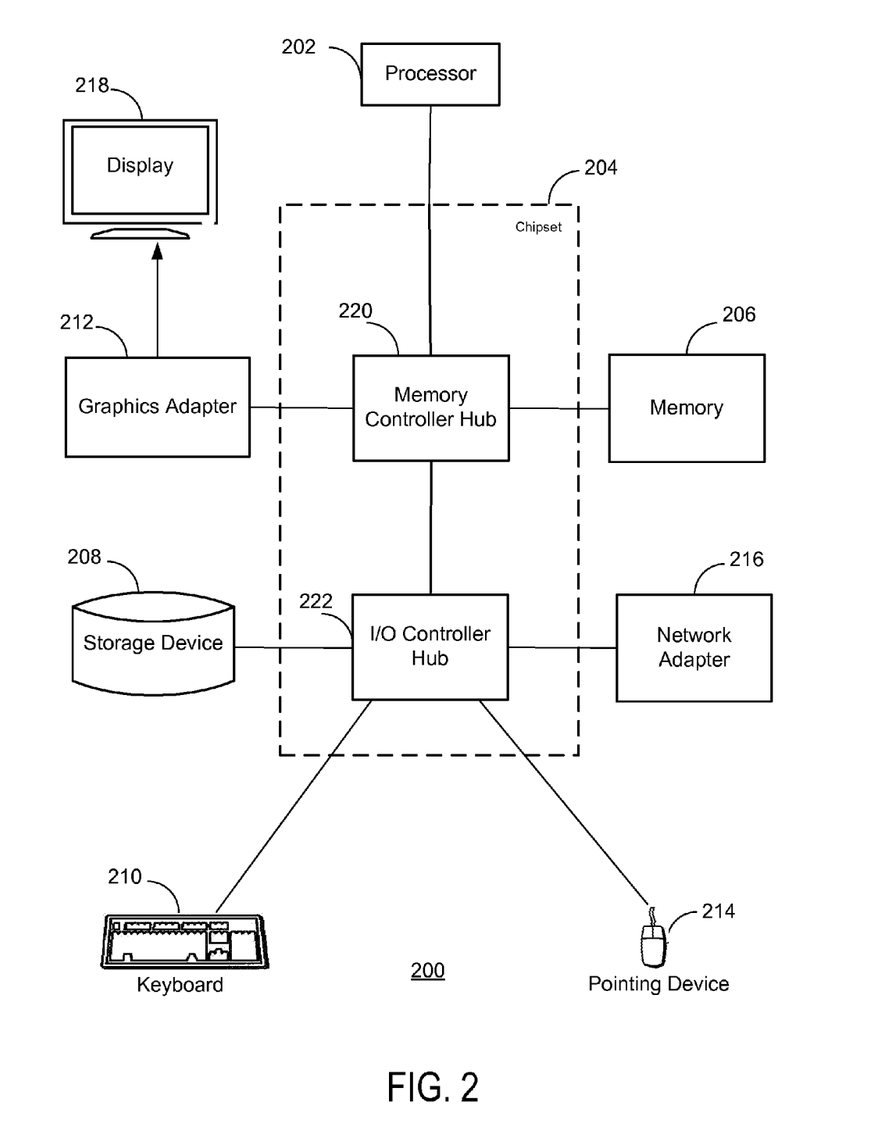
FIG. 2 is a block diagram illustrating an example computer for use as a peer or communications server in accordance with one embodiment.

FIG. 2 is a block diagram illustrating an example of a computer 200 for use as a peer 102 and/or the communication server 108. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 110. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, a computer for one entity may not include a pointing device 214.

Figure 3:
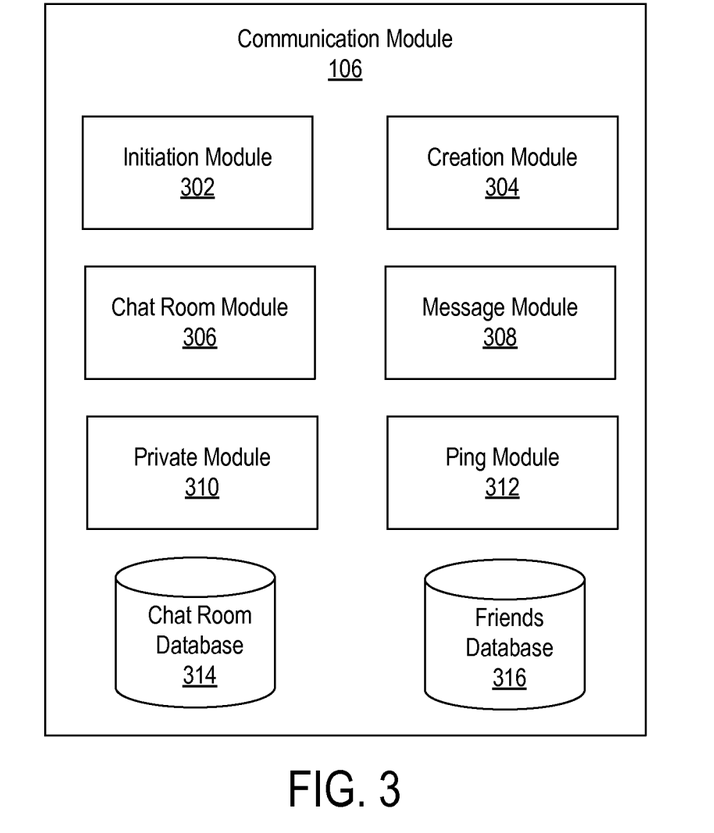
FIG. 3 is a block diagram illustrating a communication module in accordance with one embodiment.

FIG. 3 is a block diagram illustrating a detailed view of communication module 106 according to one embodiment. Communication module 106 includes an initiation module 302, a creation module 304, a chat room module 306, a message module 308, a private module 310, and a ping module 312. Those of skill in the art will recognize that other embodiments can have different modules that the ones described here, and the functionalities can be distributed among the modules in a different manner.

The initiation module 302 initiates the process of joining the advertisement room 112. In one embodiment, when a user of the peer 102 requests to join the advertisement room 112, the initiation module 302 presents a login window to the user. In one embodiment, the user enters a user name to represent the peer 102 in the advertisement room 112 and in any chat room that the peer 102 joins. In this embodiment, each time the user executes the communication module 106 and requests to join the advertisement room 112, the user may select a different user name. In another embodiment, a unique user name is assigned to the peer 102 by the communication server 108 and the user name has a password associated with it. In this embodiment, in the login window a user provides the user name and password. The initiation module 302 stores a copy of the user name and password and verifies that the user provided the correct information in the login window.

Once the user has provided the proper information requested in the login window, the initiation module 302 provides the advertisement room identifier to the connection module 104 and the connection module 104 joins the advertisement room 112 by performing a DHT lookup on the advertisement room as described above.

The creation module 304 enables the peer 102 to create a new chat room. A chat room can be created by a user of the peer 102 for exchanging information with other peers regarding a topic. When a user of the peer 102 requests to start a new chat room, a window is presented to the user requesting a name for the chat room. In one embodiment, the user can select any name for the chat room. In another embodiment, the name of the chat room must be the topic for which the chat room is intended. For example, if a chat room is for discussing a movie, the name of the chat room may be the name of the movie.

The creation module 304 creates an identifier for the chat room and stores it in a chat room database 314 along with the name of the chat room. The chat room database 314 includes a list of chat rooms that the peer 102 is a member of and a list of chat rooms that are available for the peer 102 to join. In one embodiment, the identifier of the chat room is a random 120-bit integer. In another embodiment, the creation module 304 creates the identifier of the chat room using the name of the chat room. In this embodiment, the identifier may be created by applying a hash function to the name, such a MD5 or SHA-256 hash function. The creation module 304 provides the identifier to the connection module 104. The connection module 104 identifies which of the peers in advertisement room 112 with which it has a connection that is closest to the chat room identifier. The connection module 104 provides its connection information to the closest peer 102 along with the chat room identifier. The connection module 104 additionally notifies the closest peer 102 that it is a member of the chat room.

In one embodiment, the creation module 304 periodically transmits to other peers in the advertisement room an advertisement for each chat room of which it is a member. In another embodiment, each advertisement is transmitted to any peer 102 with who the connection module 104 has established a connection, regardless of whether the other peer is in advertisement room 112. An advertisement notifies a peer 102 that a chat room is available for the peer to join. In one embodiment, the advertisement for a chat room includes the chat room identifier, the name of the chat room, a time to live (TTL), and a list of peers that have received the advertisement. The TTL is the number of times that the advertisement should be forwarded to other peers by a peer 102 receiving the advertisement. In one embodiment, the advertisement may include a link (e.g., a magnet link) with the chat room identifier and other information encoded in the link. In one embodiment, the creation module 304 only sends advertisements for chat rooms created by the creation module 304.

The chat room module 306 enables a user of the peer 102 to join a chat room. When the communication module 106 receives an advertisement for a chat room, the chat room module 306 automatically adds the chat room's name and identifier to the list of available chat rooms in the chat room database 314 if it is not already included. The chat room module 306 forwards the advertisement to other peers in the advertisement room 112 if the TTL of the advertisement has not elapsed. In one embodiment, the chat room module 306 uses the list of available chat rooms to present to a user of the peer 102 the names of available chat rooms in a window. In one embodiment, if the user requests to search for a chat room, the chat room module 306 presents a search interface to the user. When the user enters a query, the chat room module 306 searches the names of the chat rooms in the available chat room lists and presents to the user any chat rooms that match the query. In one embodiment, the chat room module 306 periodically goes through the list of available chat rooms and removes any chat rooms for which an advertisement has not been received within a set amount of time.

In one embodiment, when the user requests to join an available chat room, the chat room module 306 adds the chat room to the list of chat rooms that the peer 102 is a member of in the chat room database 314. The chat room module 306 identifies the chat room's identifier in the chat room database 314 and provides it to the connection module 104. The connection module 104 uses the chat room identifier to join the swarm of the chat room.

In one embodiment, after having logged off from the advertisement room 112, e.g., after having left the swarm of the advertisement room 112, when the communication module 106 is executed and the peer 102 rejoins the advertisement room 112, the chat room module 306 rejoins the chat rooms to which the peer 102 is a member. To rejoin the chat rooms, the chat room module 306 determines the identifiers of chat rooms in the list of member chat rooms. The chat room module 306 provides the identifiers to the connection module 104 and requests that the connection module 104 rejoin each chat room for which an identifier was provided. In one embodiment, if there are no longer any peers that are part of a chat room, the connection module 104 fails to rejoin the chat room. In another embodiment, if there are no longer any peers that are part of a chat room, the connection module 104 joins the chat room as its only member.

The message module 308 transmits and receives messages from other peers. When a user of the peer 102 requests to transmit a message to a chat room of which the peer 102 is a member, the message module 308 generates the message based on information provided by the user in the request. In one embodiment, the message includes the information provided by the user, the identifier of the chat room, user name assigned to the peer 102, a TTL, and a list of peers that have received the message. The message module 308 transmits the message to peers in the chat room with which connection module 104 has established connections.

In response to receiving a message from another peer 102 in a chat room, the message module 308 presents the message in the window of the chat room along with the user name included in the message. In one embodiment, the information exchanged in messages between peers is text. However, any type of information may be included in messages, such as media content, e.g., audio, video, still images, and social network information.

The private module 310 initiates a private chat between two peers in the advertisement room 112. A private chat includes messages exchanged between only two peers that share a direct connection and are not rebroadcast to other peers. The private module 310 stores a communication identifier of the communication module 106 and a public and private key pair of the communication module 106. Each communication module 106 has its own unambiguous communication identifier, public key, and private key. In one embodiment, the communication identifier and the key pair of the communication module 106 are provided when the communication module 106 is installed on the peer 102. The communication identifier and the key pair of the communication module 106 do not change. In one embodiment, the communication identifier is a 120-bit integer.

At any time, a user of the peer 102 can request to have a private chat with another peer 102 that is part of a common chat room (i.e., a chat room of which both peers are members). If the private module 310 receives a request from a user to transmit a message to another peer 102 in a private chat, the private module 310 generates the private message based on information provided by the user in the request. In one embodiment, the private message includes the information provided by the user, the user name assigned to the peer 102, the communication identifier and public key of the communication module 106, and an indication that the message is private. The private module 310 transmits the private message to the other peer 102 and includes the message in a window presented to a user of the peer 102 that includes messages of the private chat between the two peers. When the private module 310 receives a private message from the other peer 102, the private module 310 presents the private message in the window with the user name of the other peer 102.

In one embodiment, a user of the peer 102 may request to add another peer 102 as a friend. If the user requests to add the other peer 102 as a friend, the private module 310 adds the other peer 102 as a friend by storing in a friends database 316 the communication identifier, public key, and connection information of the other peer 102 and a private chat identifier. Friends database 316 stores information about friends of the peer 102. A private chat identifier is an identifier of a swarm that both peers join when their respective communication module 106 is executed so that the peers can exchange private messages only amongst themselves (i.e., have a private chat). The swarms assigned by private chat identifiers are referred to as friend swarms herein. In one embodiment, the private module 310 creates the private chat identifier by calculating the exclusive OR of the communication identifiers of both peers 102.

When the communication module 106 is executed after having logged off, the private module 310 automatically joins the friend swarms shared with friends that are identified in the friends database 316. To join a friend swarm shared with a friend, the private module 310 has the connection module 104 perform a DHT lookup on the private chat identifier of the swarm.

When both peers have joined the friend swarm by performing a DHT lookup on the private chat identifier, the private module 310 verifies that the other peer 102 is in fact the friend that is supposed to be a part of the friend swarm. To verify, the private module 310 transmits a randomly generated message to the other peer 102. In return, the private module 310 receives from the other peer 102 a signed message. The random message is signed by the other peer 102 using its own private key. The private module 310 performs a signature verification on the message using the other peer's public key. If the verification is successful, the private module 310 knows that the other peer 102 is the friend that is supposed to be part of the swarm.

The other peer 102 also verifies that private module's peer is the correct peer. When the private module 310 receives a random message from the other peer 102, the private module 310 retrieves its public key and signs the random message. The private module 310 transmits the signed message to the other peer 102. Once both peers have verified each other, the peers can have a private chat.

The ping module 312 sends and receives pings from peers that are part of the advertisement room 112. In one embodiment, the ping module 312 periodically transmits a ping to each peer 102 in the advertisement room 112 with whom the connection module 104 has established a connection. A ping lets the receiving peer 102 know that the peer 102 of the ping module 312 is still logged on and part of the advertisement room 112. In one embodiment, a ping transmitted by a peer 102 includes one or more of the following: the communication identifier and public key of the transmitting peer's communication module 106, the user name being used for the transmitting peer 102, a TTL, and a list of peers that have received the ping.

In one embodiment, the ping module 312 maintains a panel presented to the user of the peer 102. The panel includes the chat rooms that the peer 102 is a member of and friends in the friend database 316. Each friend in the panel includes an identifier indicating whether the friend is currently is logged in. In one embodiment, the ping module 312 periodically goes through the friends in the panel and for each friend checks whether a ping has been received for the friend within a set time. If a ping has been received within the set time, the ping module 312 verifies that the panel indicates that the friend is logged in. On the other hand, if a ping has not been received within the set time, the ping module 312 verifies that the panel indicates that the friend is currently logged off.

Figure 4:
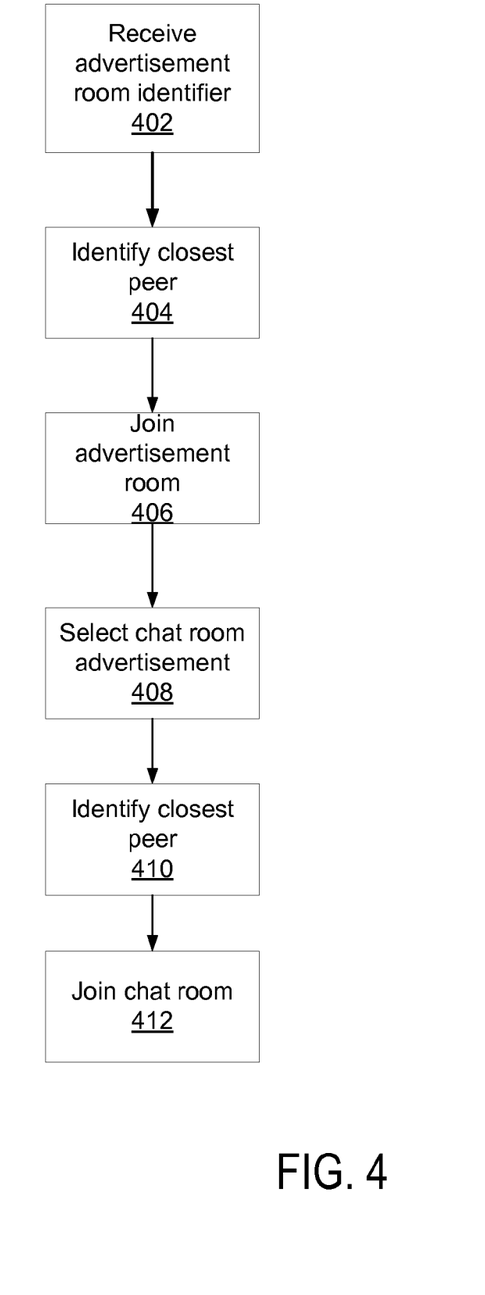
FIG. 4 is a flowchart illustrating a method for joining a peer-to-peer chat room in accordance with one embodiment.

FIG. 4 is a flowchart illustrating steps as described above for joining a peer-to-peer chat. A peer 102 receives 402 an identifier for an advertisement room 112. In some embodiments, the identifier is received from another peer, or from a web site, or from a communication server 108. In some embodiments, the identifier remains static, while in other embodiments the identifier is dynamic and is re-obtained by peer 102 from time to time. Once the joining peer has the advertisement room identifier, the peer identifies 404 the closest peer which, in one embodiment, is a connected peer having the closest DHT ID to the advertisement room identifier. Peer 102 then connects to the peer and joins 406 the advertisement room.

While joined to the advertisement room swarm, the peer receives advertisements from other peers in the advertisement room 112. In response to a selection 408 to join an advertised chat room, the joining peer 102 identifies 410 the closest peer to the chat room as described above. The joining peer then joins 412 the chat room and begins sending and receiving chat messages with other peers in the chat room swarm.

Reference in the specification to "one embodiment" or to "an embodiment" means that a particular feature, structure, or characteristic is included in at least one embodiment of the invention. The various appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for chatting in a peer-to-peer computer network, the method comprising:
   joining, by a computer system, an advertisement peer-to-peer network by establishing a connection with a plurality of peers that are part of the advertisement peer-to-peer network;
   receiving, by the computer system via the advertisement peer-to-peer network, a chat room advertisement identifying a chat room;
   responsive to receiving a request from a user of the computer system to join the identified chat room, calculating, by the computer system for each of the plurality of peers, a difference between an identifier associated with the peer and an identifier associated with the chat room;
   selecting, by the computer system a peer from the plurality of peers based on the selected peer having the lowest calculated difference;
   requesting, by the computer system from the selected peer, connection information associated with peers that are part of the chat room; and
   responsive to receiving connection information from the selected peer, joining, by the computer system, the chat room using the received connection information.

2. The method of claim 1, further comprising:
   receiving, by the computer system, a chat message intended for the chat room from a peer in the chat room;
   displaying, by the computer system, the received chat message in a user interface; and
   forwarding, by the computer system, the chat message to at least one other peer in the chat room.

3. A computer program product for chatting in a peer-to-peer computer network, the computer program product stored on a non-transitory computer readable medium and including code configured to cause a computer system to carry out steps comprising:
   joining an advertisement peer-to-peer network by establishing a connection with a plurality of peers that are part of the advertisement peer-to-peer network;
   receiving, via the advertisement peer-to-peer network, a chat room advertisement identifying a chat room;
   responsive to receiving a request from a user of the computer system to join the identified chat room, calculating, for each of the plurality of peers, a difference between an identifier associated with the peer and an identifier associated with the chat room;
   selecting a peer from the plurality of peers based on the selected peer having the lowest calculated difference;
   requesting, from the selected peer, connection information associated with peers that are part of the chat room; and
   responsive to receiving connection information from the selected peer, joining the chat room using the received connection information.

4. The method of claim 1, wherein joining the chat room comprises:
   establishing a connection with one or more peers that are part of the chat room using the received connection information.

5. The method of claim 1, further comprising:
   receiving an additional request from the user to send a chat room message in the chat room;
   generating the chat room message based on the additional request; and transmitting the chat room message to a subset of peers from an additional plurality of peers that are part of the chat room, the computer system having a connection with each peer in the subset.

6. The method of claim 5, wherein the chat room message includes the identifier associated with the chat room, a user name associated with the user, and a number of times that the chat room message should be forwarded to one or more peers that are part of the chat room.

7. The method of claim 1, further comprising:
identifying a time to live associated with the chat room advertisement; and
responsive to determining the time to live has not elapsed, forwarding the chat room advertisement to at least one of the plurality of peers that are part of the advertisement peer-to-peer network.

8. The method of claim 1, further comprising:
periodically transmitting chat room advertisements in the advertisement peer-to-peer network for chat rooms that the computer system is a part of, each chat room advertisement identifying at least one of the chat rooms.

9. The computer program product of claim 3, wherein the steps further comprise:
receiving a chat message intended for the chat room from a peer in the chat room;
displaying the received chat message in a user interface; and
forwarding the chat message to at least one other peer in the chat room.

10. The computer program product of claim 3, wherein joining the chat room comprises:
establishing a connection with one or more peers that are part of the chat room using the received connection information.

11. The computer program product of claim 3, wherein the steps further comprise:
receiving an additional request from the user to send a chat room message in the chat room;
generating the chat room message based on the additional request; and
transmitting the chat room message to a subset of peers from an additional plurality of peers that are part of the chat room, the computer system having a connection with each peer in the subset.

12. The computer program product of claim 11, wherein the chat room message includes the identifier associated with the chat room, a user name associated with the user, and a number of times that the chat room message should be forwarded to one or more peers that are part of the chat room.

13. The computer program product of claim 3, wherein the steps further comprise:
identifying a time to live associated with the chat room advertisement; and
responsive to determining the time to live has not elapsed, forwarding the chat room advertisement to at least one of the plurality of peers that are part of the advertisement peer-to-peer network.

14. The computer program product of claim 3, wherein the steps further comprise:
periodically transmitting chat room advertisements in the advertisement peer-to-peer network for chat rooms that the computer system is a part of, each chat room advertisement identifying at least one of the chat rooms.

15. A system for chatting in a peer-to-peer computer network, the system comprising:
one or more computer processors; and
a non-transitory computer readable medium including code configured to cause the one or more processors to carry out steps comprising:
joining an advertisement peer-to-peer network by establishing a connection with a plurality of peers that are part of the advertisement peer-to-peer network;
receiving, via the advertisement peer-to-peer network, a chat room advertisement identifying a chat room;
responsive to receiving a request from a user to join the identified chat room, calculating, for each of the plurality of peers, a difference between an identifier associated with the peer and an identifier associated with the chat room;
selecting a peer from the plurality of peers based on the selected peer having the lowest calculated difference;
requesting, from the selected peer, connection information associated with peers that are part of the chat room; and
responsive to receiving connection information from the selected peer, joining the chat room using the received connection information.

16. The system of claim 15, wherein the steps further comprise:
receiving an additional request from the user to send a chat room message in the chat room;
generating the chat room message based on the additional request; and
transmitting the chat room message to a subset of peers from an additional plurality of peers that are part of the chat room, a connection existing with each peer in the subset.

17. The system of claim 15, wherein the steps further comprise:
identifying a time to live associated with the chat room advertisement; and
responsive to determining the time to live has not elapsed, forwarding the chat room advertisement to at least one of the plurality of peers that are part of the advertisement peer-to-peer network.

* * * * *